United States Patent [19]

Horvath

[11] 4,046,481

[45] Sept. 6, 1977

[54] GLAND NUT RETAINING MEANS

[75] Inventor: Louis T. Horvath, Solon, Ohio

[73] Assignee: Detroit Marine Engineering Corporation, Detroit, Mich.

[21] Appl. No.: 743,950

[22] Filed: Nov. 22, 1976

[51] Int. Cl.² ........................ B25G 3/00; F16B 7/18; F16B 39/32

[52] U.S. Cl. .................................... 403/320; 151/48; 403/342

[58] Field of Search ................. 151/52, 48, 49, 50, 151/13, 44, 9–11; 403/342, 320; 285/82, 91, 319, 393; 85/32.1

[56] References Cited

U.S. PATENT DOCUMENTS

| | | | |
|---|---|---|---|
| 781,067 | 1/1905 | Hewitt | 151/48 X |
| 2,031,878 | 2/1936 | Coutu | 403/342 X |
| 2,082,228 | 6/1937 | Stoll | 151/48 X |
| 2,125,303 | 8/1938 | McRoberts | 403/342 X |
| 2,742,072 | 4/1956 | Murphy | 151/48 X |
| 2,792,084 | 5/1957 | Mossey | 151/48 X |

*Primary Examiner*—Ramon S. Britts
*Attorney, Agent, or Firm*—Harness, Dickey & Pierce

[57] ABSTRACT

Retaining means for preventing loosening of a gland nut, for example, at the end of a push-pull outboard motor steering cable. The gland nut is provided with a plurality of circumferentially spaced axially extending ribs. The retainer comprises a ring of spring-like material with a plurality of locking fingers engaging the conduit fitting and axially extending fingers fitting between the gland nut ribs. The latter fingers have rounded end depressions allowing positive rotation of the gland nut but preventing loosening of the nut through vibration.

3 Claims, 8 Drawing Figures

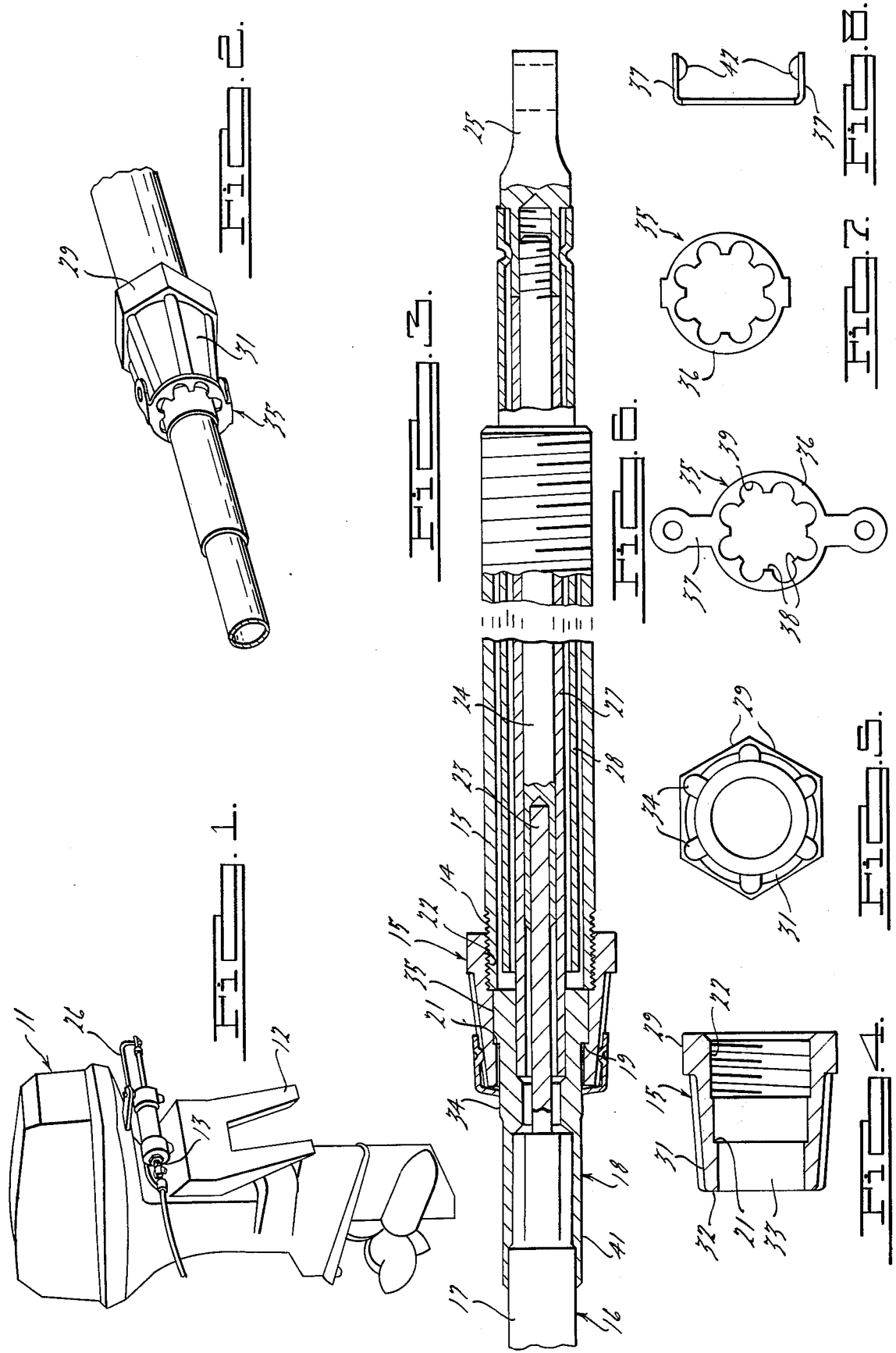

GLAND NUT RETAINING MEANS

BACKGROUND OF THE INVENTION

1. Field of the Invention

The invention relates to the retention of gland nuts such as are used to secure the end of a push-pull steering cable to an outboard motor. Typically, the push-pull cable is held in the tubular motor tilt shaft with the nut coupler. When the nut is properly tightened, the system is quite sound and retains its holding strength. However, there are times when the cable is removed from the motor, for example, for servicing or storage; upon reinstallation the nut coupler may not be torqued sufficiently and the motor and boat vibrations and shocks may cause the nut coupler to gradually turn until it falls off the motor tilt tube and thus causes steering to become disengaged. Tightening to a proper torque even on original installation may be difficult since a standard torque wrench can sometimes not be utilized because of the location of the part.

2. Description of the Prior Art

Among prior methods of attempting to prevent this loosening of a gland nut by vibration are the use of nylon or other plastic inserts in the gland nut. These have limited life or reuseability. Other methods include sprays or swatches which likewise have limited reuseable lives. Another type of construction is a split nut with a clamping bolt, which is relatively bulky, cumbersome and expensive.

BRIEF DESCRIPTION OF THE INVENTION

It is an object of the present invention to provide gland nut retaining means which overcomes disadvantages of previous constructions and methods and ensures secure holding of the gland nut despite vibration without the need for any new or additional tools.

It is another object to provide a nut lock and retainer which, unlike previous retaining means, does not have parts which will wear out and therefore has greatly extended re-use capability.

It is also an object to provide gland nut retaining means of this character which performs the additional function of preventing the gland nut from sliding down the cable during handling and installation.

Briefly, the invention comprises a gland nut having a bore threaded at one end and a shoulder for engaging a fitting, an outer surface on said nut having a plurality of circumferentially spaced axially extending portions which are at greater distances from the axis than the remaining area of the outer surface, a retainer of spring-like material having an annular main portion surrounding said fitting adjacent the other end of the nut and a plurality of inwardly extending locking fingers tightly engaging said fitting, and a plurality of circumferentially spaced axially extending tabs on the outer edge of said main portion, said tabs having portions engageable with the outer surface of said nut, said last-mentioned portions being engageable by said nut surface portions upon forced rotation of said nut whereby said tabs will be temporarily spread apart to allow said portions to pass thereunder, said tabs having sufficient inward spring-like engaging force to prevent said portions from passing thereunder in response to vibration of the nut.

BRIEF DESCRIPTION OF THE DRAWINGS

FIG. 1 is a perspective view of an outboard motor showing the connection of a push-pull steering cable to the motor tilt shaft, the connection utilizing the nut retaining means of the present invention;

FIG. 2 is a fragmentary perspective view showing the retaining means for the gland nut on the conduit fitting;

FIG. 3 is a fragmentary elevational view of the cable assembly, partially cross-sectioned;

FIG. 4 is a cross-sectional view in elevation of the gland nut;

FIG. 5 is an end elevational view of the nut;

FIG. 6 is an elevational view of a blank from which the retainer may be constructed;

FIG. 7 is a view similar to FIG. 6 showing the retainer after the tabs have been bent into place; and FIG. 8 is a side elevational view of the retainer.

DESCRIPTION OF THE PREFERRED EMBODIMENT

A typical outboard motor steering arrangement is shown in FIG. 1. The outboard motor is generally indicated at 11 and has a transom bracket 12, the motor being connected to the transom bracket by means of a tubular motor tilt shaft 13. This shaft is shown more clearly in FIG. 3, the shaft having a threaded end 14 for receiving a gland nut generally indicated at 15. A gland nut is conventionally used to secure one end of a push-pull cable generally indicated at 16 to the shaft. The exterior portion 17 of the push-pull cable is fixed to a conduit fitting generally indicated at 18, the conduit fitting having a shoulder 19 which is engaged by an interior shoulder 21 in the bore of gland nut 15 so that when the threaded portion 22 of the gland nut bore is mounted on portion 14 of the shaft, the conduit fitting will be held rigidly against the end of shaft 13.

The inner element 23 of the cable 16 is secured to a push rod 24 which extends through shaft 13 and carries and eye 25 at its other end connected to a link arm 26 of the steering mechanism for motor 11. A slave guide tube 27 surrounds push rod 24, this guide being disposed within a slave telescopic tube 28.

The purpose of the invention is to ensure that gland nut 15 will remain in position on shaft 13 after it has been threaded onto and tightened with respect to threads 14. The gland nut has six flat surfaces 29 forming the conventional hexagon for engagement by a wrench. This portion of the nut is adjacent that end which carries threads 22. The surface 31 of the nut extending away from hexagonal portion 29 is frustoconical in shape, terminating at flat end 32 of the nut. Bore portion 33 of nut 15 between shoulder 21 and end 32 has a diameter close to that of the surface of conduit fitting 18.

A plurality of ribs 34 extending axially from hexagonal portion 29 of the nut to end 32. These ribs are circumferentially spaced, six ribs being shown in the illustrated embodiment. The ribs have rounded tops so as to permit them to pass under portions of the retainer about to be described.

The retainer is generally indicated at 35 and has a main ring portion 36 and a plurality of tabs 37 extending axially from the outer edge of portion 36. The entire retainer may be fabricated of a spring-like material such as spring temper stainless steel. The retainer may be fabricated from a blank shown in FIG. 6 with the tabs thereafter bent into the position of FIGS. 7 and 8. Portion 36 of the retainer has a plurality of inwardly extending fingers 38 with recesses 39 therebetween so as to permit a certain amount of flexibility of these fingers in axial direction. The inner edges of fingers 38 are preferably on a diameter which is slightly less than that of the conduit fitting surface. Therefore, when the retainer is slipped onto the conduit fitting from that portion 41 which is of lesser diameter (FIG. 3), fingers 38 will slightly flex in a direction preventing backward movement of the retainer toward portion 41 of the fitting, and frictionally holding retainer 35 against rotation.

Tabs 37 of retainer 35 have indentations forming inward protuberances 42. The width of the tabs and their radial disposition are such that protuberances 42 will normally rest on surface 31 of nut 15.

In operation, with nut 15 and retainer 35 assembled onto fitting 18 as shown in FIG. 3, the nut will be threaded onto shaft 13 and tightened by means of a wrench applied to hexagonal surfaces 29. During this rotation shoulder 31 of the nut will engage shoulder 19 of the fitting to draw the fitting up against the end of shaft 13. At the same time ribs 34 will ride under protuberances 42, temporarily springing tabs 37 outwardly as they pass thereunder. Thus, there will be no interference with the tightening process although tabs 37 will offer some resistance to the tightening movement. If desired, retainer 35 may be slid up against end 32 of the nut after tightening has taken place.

Thereafter, retainer 35 will ensure that vibration during operation of the outboard motor will not result in the nut backing off the shaft. Any rotation in this direction will be resisted by two ribs 34 coming into contact with the sides of protuberances 42. The inward pressure of spring-like tabs 37 will be sufficient to prevent the vibration from causing ribs 34 to pass under the tabs.

Should it be necessary, however, to remove push-pull cable 16 from shaft 13, this is easily accomplished by applying a wrench to surfaces 29 and rotating nut 15, causing ribs 34 to be deliberately passed under tabs 37.

The retaining means of this invention, having no parts which will quickly wear out, is reuseable indefinitely. It will also be observed that the presence of the retainer 35 on surface 34 of the conduit fitting will act as a keeper, preventing the gland nut from sliding down the cable during handling and installation.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. In combination, a gland nut and a tubular conduit fitting, said gland nut having a bore threaded at one end and a square internal shoulder engaging a square external shoulder on said conduit fitting, an outer surface on said nut having a pluraliy of circumferentially spaced axially extending portions which are at greater distances from the axis than the remaining area of the outer surface, a retainer of spring-like material having an annular flat main portion surrounding said fitting adjacent the other end of the nut and a plurality of inwardly extending locking fingers tightly engaging said fitting, the inner edges of said locking fingers being on a diameter slightly less than the external fitting surface whereby slipping said retainer axially onto said fitting causes said fingers to slightly flex in a direction preventing backward movement of the retainer and frictionally holding the retainer against rotation, and a plurality of circumferentially spaced axially extending tabs on the outer edge of said flat main portion, said tabs having portions engaging the outer surface of said nut, said last-mentioned portions being engageable by said nut surface portions upon forced rotation of said nut whereby said tabs will be temporarily spread apart to allow said portions to pass thereunder, said tabs having sufficient inward spring-like engaging force to prevent said portions from passing thereunder in response to vibration of the nut.

2. A combination according to claim 1, said gland nut having a polygonal end for engagement by a wrench and a frustoconical surface extending away from said polygonal end, said nut surface portions comprising ribs spaced around said frustoconical surface.

3. A combination according to claim 1, said nut surface portions comprising ribs having rounded tops, said retainer tabs having inwardly extending protuberances engageable by said ribs.

* * * * *